United States Patent [19]

Dombroski et al.

[11] 4,042,442

[45] Aug. 16, 1977

[54] 2-CYANOACRYLATE ADHESIVE COMPOSITION

[75] Inventors: John R. Dombroski, Kingsport; Doyle A. Weemes, Greeneville, both of Tenn.

[73] Assignee: Eastman Kodak Company, Rochester, N.Y.

[21] Appl. No.: 745,757

[22] Filed: Nov. 29, 1976

[51] Int. Cl.$^2$ .............................................. B32B 7/00
[52] U.S. Cl. .................................. 156/310; 156/314; 156/331; 260/881; 260/885; 427/302; 428/522; 526/298
[58] Field of Search ................... 156/331, 314, 310; 427/302; 428/463, 522; 526/298; 260/881, 256, 885

[56] References Cited

U.S. PATENT DOCUMENTS

| 2,765,332 | 10/1956 | Coover et al. | 526/298 |
| 2,784,127 | 3/1957 | Joyner et al. | 428/463 |
| 3,178,379 | 4/1965 | Wicker et al. | 260/881 |
| 3,260,637 | 7/1966 | Von Bramer | 156/314 |
| 3,970,505 | 7/1976 | Hauser et al. | 156/310 |

FOREIGN PATENT DOCUMENTS

| 938,742 | 10/1963 | United Kingdom | 156/331 |
| 1,000,665 | 8/1965 | United Kingdom | 156/310 |

*Primary Examiner*—Charles E. Van Horn
*Assistant Examiner*—J. J. Gallagher
*Attorney, Agent, or Firm*—Elliott Stern; Daniel B. Reece, III

[57] ABSTRACT

Adhesive composition comprising
  A. at least one monomeric ester of 2-cyanoacrylic acid, and
  B. at least one polymerization initiator selected from caffeine and theobromine.

18 Claims, No Drawings

2-CYANOACRYLATE ADHESIVE COMPOSITION

This invention relates to the use of initiators with alphacyanoacrylate adhesive compositions. It is particularly concerned with the use of caffeine or theobromine as an initiator for promoting the polymerization of 2-cyanoacrylate adhesive compositions in thick, gapfilling layers. The initiators of this invention can be applied to the substrate prior to bonding or can be conveniently added to the 2-cyanoacrylate adhesive just prior to use. The initiators of this invention impart an unusual and unexpected polymerizing capability to the thickened 2-cyanoacrylate adhesive composition which give thick, gap-filled bonds with excellent lap shear strengths. The initiators of this invention also exhibit highly advantageous physical properties when used in conjunction with unthickened 2-cyanoacrylate adhesives.

An important property of 2-cyanoacrylate adhesive compositions is their ability to rapidly polymerize in the presence of weakly basic catalysts such as water, alcohols, and amines. See for example U.S. Pat. Nos. 3,260,637 and 2,768,109. In most cases, the absorbed moisture on surfaces is sufficient to rapidly initiate the 2-cyanoacrylate polymerization as the substrates are pressed together. Bonds formed by this technique involve only a thin layer of adhesive. For many other applications, however, it is desirable to increase the overall thickness of the adhesive layer to insure adequate bond formation of substrates separated by, for example, a shim spacer, void or gap. It is desirable for these thicker adhesive layers to polymerize rapidly and form a strong bond. In some cases, the polymerization of the adhesive composition has been accelerated by either treating the surface to be bonded with a basic material or by adding a small amount of a basic catalyst to the adhesive just prior to use. Treatment of substrates with basic materials such as alcohols, ammonia, pyridine, dimethylaniline, sodium hydroxide, and the like, however, causes the bonding to occur with such extreme rapidity that weak bonds are formed. Furthermore, it is difficult to incorporate the basic substance into the adhesive just prior to use, since this often results in either encapsulation of the activator droplets with no further reaction or an instantaneous polymerization of the monomer mass.

The problems associated with the prior art have been overcome by the use of an adhesive composition comprising A. at least one monomeric ester of 2-cyanoacrylic acid, and
B. at least one polymerization initiator selected from caffeine and theobromine.

In a preferred embodiment of the invention the initiator utilized is caffeine because of its availability, low cost and desirable performance characteristics. In an especially preferred embodiment the ester of 2-cyanoacrylic acid has been modified with from 0.1 to about 25 parts by weight of a thickening agent. The amount of initiator utilized in the practice of the invention is from 0.01 to about 10 parts by weight, based on the weight of the adhesive. Preferably the amount is 0.1 to about 3 parts by weight. Suitable adhesive compositions for practicing this invention comprise one or more 2-cyanoacrylate monomers represented by the formula:

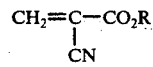

wherein R represents alkenyl having 2 to 6 carbon atoms, cyclohexyl, phenyl, and alkyl having 1 to 16 carbon atoms. Examples of the monomers utilizable and included in this invention are for example, allyl, methylallyl, butyryl, cyclohexyl, phenyl, methyl, butyl, ethyl, isobutyl, hexyl, decyl, pentadecyl and the like. Of these 2-cyanoacrylates the preferred are methyl 2-cyanoacrylate, allyl 2-cyanoacrylate, butyl 2-cyanoacrylate, isobutyl 2-cyanoacrylate and ethyl 2-cyanoacrylate. Of these adhesives the allyl 2-cyanoacrylate is the most preferred. The thickening agents utilizable in the practice of this invention are any of the well-known thickening agents which have been found to be useful with 2-cyanoacrylate adhesives. Examples of these thickening agents are the polyacrylates, poly(methyl methacrylates), copolymers thereof, and the poly(2-cyanoacrylates). Specific examples of these thickening agents are poly(methyl methacrylate), poly(methylacrylate), cellulose acetate, and the like. The preferred thickening agent is poly(methyl methacrylate). Typically, the amount of thickening agent useful in the practice of this invention is an amount sufficient to render the composition sufficiently viscous to remain in the locus of the intended bond. Generally, it has been found that anywhere from 5 to 25% based on the weight of the cyanoacrylate adhesive composition of thickner will give the composition the desired viscosity. Preferably, around 5 to 15% thickening agent is utilized, about 10% being especially preferred.

The initiation of the 2-cyanoacrylate polymerization with either caffeine or theobromine in thick layers can be accomplished by several different techniques. In the most direct method, the initiator can be added directly to a small quantity of the thickened 2-cyanoacrylate monomer just prior to application, stirred and then applied to the gap or void area of the substrate or substrates. Polymerization of the adhesive occurs within several minutes and results in a thick, clear film with strong adhesion to the substrate or substrates. The amount of initiator utilized is from 0.01 to about 10, based on the weight of the adhesive. Preferably the amount is 0.1 to 3. In a preferred method the initiator can be first dissolved in an appropriate volatile solvent, and this solution is then applied to the substrate or substrates. After a brief time, sufficient to allow the solvent to evaporate, the desired amount of thickened 2-cyanoacrylate adhesive composition is applied to the substrate surface. Polymerization of the 2-cyanoacrylate adhesive occurs within a few minutes and forms a thick, clear film strongly bonded to the substrate or substrates. Volatile solvents useful in this process are those having a boiling point of 100° C. or below and in which the initiators are soluble. Specific examples of suitable solvents are water, saturated monohydroxy aliphatic alcohols containing from 1 to 4 carbon atoms such as methanol, ethanol, propanol, isopropanol, butanol, an ester of these alcohols with a saturated monobasic fatty acid containing from 1 to 3 carbon atoms such as methyl acetate, ethyl acetate, acetone, methyl ethyl ketone, methylene chloride, chloroform, diethyl ether, dimethyl ether, methyl chloroform, and mixtures of these solvents. Generally, the amount of initiator used in this process is 0.1 to about 10, and preferably 2 to 5 parts by weight, based on the weight of the volatile solvent.

If desired, a plasticizer may also be advantageously added to the composition such as alkyl esters of aliphatic monocarboxylic acids, e.g., methylcyanoacetate, ethylcyanoacetate, etc. These plasticizers are well known in the art and further illustrated in U.S. Pat. No. 2,784,127. Additionally, the adhesive compositions may be protected against premature polymerization of the monomer by the addition thereto of polymerization inhibitors such as hydroquinone, t-butyl catechol, sulfur dioxide, nitric oxide, hydrogen fluoride, and the like.

The following examples illustrate further the manner of practicing the invention.

EXAMPLE 1

This example illustrates the overall gap-filling capability of a 2-cyanoacrylate adhesive initiated with caffeine.

a. Into a three-inch-diameter aluminum cup was added 0.5 gram of allyl 2-cyanoacrylate thickened with 10% poly(methyl methacrylate). Three milligrams (3 mg.) of caffeine are then added to the cyanoacrylate composition and stirred for 30 seconds. A portion of this solution was then added by means of a glass dropper to fill the cavity of a 3/16-inch diameter hole previously drilled in an aluminum block. Within 3 minutes, the composition polymerized and filled the entire gap with a clear hard plug of adhesive.

b. Experiment (a) was repeated with the exception that caffeine was not added to the 2-cyanoacrylate composition. After several hours, the liquid adhesive composition had not yet polymerized within the gap.

The above results illustrate the fast-setting, gap-filling capability imparted by the caffeine initiator. Similar results can be obtained using theobromine.

EXAMPLE 2

This example illustrates the effectiveness of caffeine in promoting strong; gap-filling bonding of steel substrates.

a. Cold rolled steel specimens 1/16 inch × 1 inch × 4 inches were cleaned with trichloroethane and then wiped with acetone. A five mil thick piece of adhesive tape was applied to one of the substrates and a 0.5 square inch area was cut from the tape with a sharp blade. Three successive layers of tape were applied in this manner to form a gap thickness of 15 mils. The gap area was coated with caffeine by spraying the area with a caffeine/ethyl alcohol solution and allowing the alcohol to evaporate. Allyl 2-cyanoacrylate, thickened with 10% poly(methyl methacrylate), was deposited within the gap area and the other piece of steel was placed over the adhesive in such a manner as to form a lap shear specimen. The lap shear strength was determined after 10 minutes, 30 minutes, one hour, and 24 hours of bonding time. The results are listed in Table 1 below.

b. The above experiments were repeated using methyl 2-cyanoacrylate, thickened with 5.5% poly(methyl methacrylate). No caffeine initiator was used. The results are listed in Table 1 below.

Table 1

| Adhesive | Age of Bond | 15 Mil Adhesive Cap Lap Shear* Strength (psi) |
| --- | --- | --- |
| Per Example 1a 90% Allyl 2-cyanoacrylate 10% Polymethyl methacrylate Caffeine Initiator | 10 min 30 min 1 hr 24 hr | 1419 1471 1870 2600 |
| Per Example 1b 94.5% Methyl 2-cyanoacrylate 5.5% Polymethyl methacrylate No Initiator | 10 min 30 min 1 hr 24 hr | 19 27 26 1048 |

*ASTM D-1002-64

EXAMPLE 3

This example illustrates the unexpected capability of the 2-cyanoacrylate adhesive/caffeine initiator system in forming strong, gapfilled bonds even on oily substrates. Lap shear specimens with 15 mil gap thickness were prepared as in Example 1a. However, the gap area was intentionally coated with various oils and the effect on the lap shear strength is noted in Table 2.

Table 2

| Adhesive | Oil on Substrate | Caffeine Initiator | 15 Mil* Adhesive Gap Lap Shear Strength (psi) |
| --- | --- | --- | --- |
| 90% Allyl 2-cyanoacrylate 10% Polymethyl methacrylate | None None Cutting oil Cutting oil 30w motor oil 30w motor oil | None Yes None Yes None Yes | 1515 2289 2001 2249 1715 2523 |

*Time before testing 24 hrs. - Procedure ASTM D-1002-64

EXAMPLE 4

The objective of this example was to measure the set time and lap shear strength of a 2-cyanoacrylate-based gap filling adhesive on selected substrates. The gap filling adhesive is allyl 2-cyanoacrylate thickened with 10 weight percent Elvacite 2041 (polymethyl methacrylate) a trademark of E. I. du Pont de Nemours and polmerized with the surface activator, caffeine. The results (Table 3) show the gap filling adhesive gives fast-setting, high lap shear strength bonds across 2, 5 and 15 mil gaps on metal-to-metal, plastic-to-plastic and plastic-to-metal substrates. It was concluded that the gap filling adhesive gives excellent fast-setting adhesive performance across gaps up to 15 mils.

Table 3

Set Time and Lap Shear Strength of Gap Filling Cyanoacrylate
Adhesive on Selected Substrates

| Substrates | Gap Thickness | Gap Filling Adhesive[1] | | MCA[2] | |
|---|---|---|---|---|---|
| | | Lap Shear** Strength (PSI) | Set*** Time (Min.) | Lap Shear** Strength (PSI) | Set*** Time (Min.) |
| Steel-to-Steel | 2 Mil | 2777 | <1 | 1908 | >30 |
| | 5 Mil | 2719 | <1 | 1298 | >30 |
| | 15 Mil | 2801 | 2 | 751 | >60 |
| Aluminum-to-Aluminum | 2 Mil | 1211 | <1 | 215 | >30 |
| | 5 Mil | 1307 | <1 | 737 | >30 |
| | 15 Mil | 1360 | 2 | 337 | >60 |
| Steel-to-Aluminum | 2 Mil | 1272 | <1 | 186 | >30 |
| | 5 Mil | 1639 | <1 | 104 | >30 |
| | 15 Mil | 1502 | 2 | 70 | >60 |
| Fiberglass Reinforced Plastic (FRP)-to-FRP | 2 Mil | 627 | <1 | 1220 | >30 |
| | 5 Mil | 778 | <1 | 1197 | >30 |
| | 15 Mil | 692 | 2 | 1145 | >60 |
| Phenolic-to-Phenolic | 2 Mil | 1002* | <1 | 1023* | >30 |
| | 5 Mil | 993* | <2 | 1074* | >30 |
| | 15 Mil | 1048* | 2 | 922* | >60 |
| Polycarbonate-to-Aluminum | 2 Mil | 575* | <1 | 869* | >30 |
| | 5 Mil | 452* | <1 | 827* | >30 |
| | 15 Mil | 600* | 1.5 | 853* | >60 |

[1]Allyl 2-cyanoacrylate thickened with 10 weight percent poly(methyl methacrylate) I.V. 1.72. Polymerization on substrate initiated with caffeine as in Example 1. The set time and lap shear strength of this gap-filling adhesive on steel-to-steel without the caffeine initiation is as follows:

| Substrates | Gap Thickness | Gap-Filling Adhesive Without Caffeine | |
|---|---|---|---|
| | | Lap Shear Strength (PSI) | Set Time (Min.) |
| Steel-to-Steel | 2 Mil | 2693 | 60 |
| | 5 Mil | 2516 | >90 |
| | 15 Mil | 1548 | >120 |

[2]Methyl 2-cyanoacrylate thickened with 10 weight percent poly(methyl methacrylate), I.V. 1.72.
*Substrates broke during testing.
**Determined after 24 hours. ASTM D-1002-64.
***Time for adhesive to fully polymerize within the gap.

The invention has been described in detail with particular reference to certain preferred embodiments thereof, but it will be understood that variations and modifications can be effected within the spirit and scope of the invention.

We claim:

1. Adhesive composition comprising
   A. at least one monomeric ester of 2-cyanoacrylic acid, and
   B. at least one polymerization initiator selected from caffeine and theobromine.

2. The composition of claim 1 wherein the monomeric ester of 2-cyanoacrylic acid has been modified with from about 0.1 to about 25 parts by weight of a thickening agent.

3. The composition of claim 2 wherein the 2-cyanoacrylate has the formula

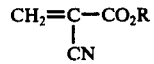

wherein R is selected from alkyl of 1 to 16 carbon atoms, alkenyl of 2 to 6 carbon atoms, phenyl and cyclohexyl.

4. The composition of claim 3 wherein the monomeric ester of 2-cyanoacrylic acid is selected from the methyl 2-cyanoacrylate, ethyl 2-cyanoacrylate, butyl 2-cyanoacrylate, isobutyl 2-cyanoacrylate, allyl 2-cyanoacrylate, and the initiator is caffeine.

5. The composition of claim 4 wherein the monomeric 2-cyanoacrylate is allyl 2-cyanoacrylate.

6. The composition of claim 5 wherein the thickening agent is poly(methyl methacrylate).

7. A process for bonding surfaces with a monomeric ester of 2-cyanoacrylic acid adhesive comprising A. uniformly distributing in said adhesive or on at least one of surfaces surface to be bonded an amount sufficient to initiate polymerization of the adhesive of a compound selected from caffeine and theobromine, B. applying said adhesive to at least one of said surfaces, and C. placing said surfaces in contact until said adhesive cures.

8. The process of claim 7 wherein the adhesive is modified with from about 0.1 to about 25 parts by weight of a thickening agent.

9. The process of claim 8 wherein the monomeric ester of 2-cyanoacrylic acid corresponds to the formula

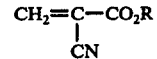

wherein R is selected from the group consisting of alkyl of 1 to 16 carbon atoms, alkenyl of 2 to 6 carbon atoms, phenyl and cyclohexyl.

10. The process of claim 9 wherein the monomeric ester of 2-cyanoacrylic acid is selected from the methyl 2-cyanoacrylate, ethyl 2-cyanoacrylate, butyl 2-cyanoacrylate, isobutyl 2-cyanoacrylate and allyl 2-cyanoacrylate, and the initiator is caffeine.

11. The process of claim 10 wherein the monomeric ester of 2-cyanoacrylic acid is allyl 2-cyanoacrylate.

12. The process of claim 11 wherein the thickening agent is poly(methyl methacrylate).

13. A method of bonding the surfaces of articles together by the use of a monomeric ester of 2-cyanoacrylic acid adhesive composition, comprising moistening at least one of the surfaces to be bonded with a solution consisting of from 0.1 to 10 parts by weight of a compound selected from caffeine and theobromine and from 90 to about 99.9 parts by weight of a solvent having a boiling point of 100° C. or below selected from the group consisting of water, saturated monohydroxy aliphatic alcohols containing from 1 to 4 carbon atoms, an ester of said alcohol with a saturated monobasic fatty acid containing from 1 to 3 carbon atoms, acetone, methyl ethyl ketone, methylene chloride, chloroform, diethyl ether, dimethyl ether, methyl chloroform, and mixtures thereof, and thereafter applying to the surface of at least one of the surfaces to be bonded a film of an adhesive composition comprising a monomeric ester of 2-cyanoacrylic acid and maintaining said surfaces in contact.

14. The process of claim 13 wherein the adhesive contains from 0.1 to about 25 parts by weight of a thickening agent.

15. The method of claim 14 in which the monomeric ester of 2-cyanoacrylic acid has the general formula $$CH_2=C-CO_2R$$
$$|$$
$$CN$$

wherein R is selected from the group consisting of alkyl of 1 to 16 carbon atoms, alkenyl of 2 to 6 carbon atoms, phenyl and cyclohexyl.

16. The process of claim 15 wherein the 2-cyanoacrylate is selected from the methyl 2-cyanoacrylate, ethyl 2-cyanoacrylate, butyl 2-cyanoacrylate, isobutyl 2-cyanoacrylate and allyl 2-cyanoacrylate, and the initiator is caffeine.

17. The process of claim 16 wherein the monomeric 2-cyanoacrylate is allyl 2-cyanoacrylate.

18. The process of claim 17 wherein the thickening agent is poly(methyl methacrylate).

* * * * *